US006199677B1

United States Patent
Belz et al.

(10) Patent No.: US 6,199,677 B1
(45) Date of Patent: *Mar. 13, 2001

(54) SPIRAL CONVEYOR APPARATUS WITH AUTOMATIC FLOW CONTROL

(75) Inventors: Donald F. Belz, Clear Spring; Duane L. Glass, Smithsburg, both of MD (US)

(73) Assignee: Carter Control Systems, Inc., Frederick, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/586,975

(22) Filed: Jun. 5, 2000

Related U.S. Application Data

(63) Continuation of application No. 09/274,314, filed on Mar. 23, 1999, which is a continuation of application No. 08/914,424, filed on Aug. 19, 1997, now Pat. No. 5,901,827.

(51) Int. Cl.[7] .................................................. B65G 13/00
(52) U.S. Cl. .......................................... 193/355; 198/778
(58) Field of Search .............................. 193/355, 35 A; 198/778, 781.05, 347.1, 347.3, 781.01, 781.06, 783

(56) References Cited

U.S. PATENT DOCUMENTS

| | | | |
|---|---|---|---|
| 790,776 | * | 5/1905 | Alvey . |
| 883,297 | * | 3/1908 | Courtney . |
| 958,004 | * | 5/1910 | Thomas . |
| 1,890,753 | * | 12/1932 | Scheurer . |
| 2,100,423 | * | 11/1937 | Zeigler . |
| 2,145,475 | * | 1/1939 | Cook ..................................... 193/355 |
| 2,834,447 | * | 5/1958 | Gmur . |
| 3,101,829 | * | 8/1963 | Silver . |
| 3,532,201 | * | 10/1970 | McConnell .......................... 193/35 A |
| 3,598,225 | | 8/1971 | Merrick . |
| 3,718,248 | | 2/1973 | Muller . |
| 3,720,302 | | 3/1973 | Kegler . |
| 3,768,630 | | 10/1973 | Inwood et al. . |
| 3,770,102 | | 11/1973 | DeGood . |
| 4,006,815 | | 2/1977 | Werntz . |
| 4,042,101 | | 8/1977 | Krammer et al. . |
| 4,266,660 | | 5/1981 | Herman . |
| 4,293,065 | | 10/1981 | Dyer et al. . |
| 4,314,629 | | 2/1982 | Shilander et al. . |
| 4,361,224 | | 11/1982 | Bowman . |
| 4,372,441 | | 2/1983 | Krammer . |
| 4,488,638 | | 12/1984 | Morgan et al. . |
| 5,033,600 | * | 7/1991 | Klein . |
| 5,070,987 | * | 12/1991 | Koltookian . |
| 5,191,967 | | 3/1993 | Woltjer et al. . |
| 5,213,189 | * | 5/1993 | Agnoff . |
| 5,228,558 | | 7/1993 | Hall . |
| 5,316,130 | | 5/1994 | Heit et al. . |

(List continued on next page.)

FOREIGN PATENT DOCUMENTS

| 3725113 | * | 9/1988 | (DE) | ..................................... 198/778 |
|---|---|---|---|---|
| 2530590 | * | 1/1984 | (FR) | ..................................... 193/355 |

*Primary Examiner*—James R. Bidwell
(74) *Attorney, Agent, or Firm*—Burns, Doane, Swecker & Mathis, L.L.P.

(57) ABSTRACT

A spiral conveyor with automatic flow control includes a plurality of curved segments connected to form a spiral for the flow by gravity of articles from an upper level to a lower level. Each of the segments includes freely rotating skate wheels forming a conveying surface and a controlled, powered cylindrical roller. A sensor mounted in each segment senses the presence of an article in the segment. A controller receives the signals from the sensors and activates the associated roller for transport mode to assist articles through the conveyor if the path is clear, or if the downstream portion of the conveyor is blocked, to reverse the roller for accumulate mode to hold articles in the segment until the path is cleared.

5 Claims, 2 Drawing Sheets

U.S. PATENT DOCUMENTS

| | | | |
|---|---|---|---|
| 5,375,689 | * 12/1994 | Sapp et al. . | |
| 5,456,347 | 10/1995 | Best et al. . | |
| 5,484,049 | 1/1996 | Huang et al. . | |
| 5,490,587 | * 2/1996 | Fisher | 193/35 A |
| 5,505,291 | 4/1996 | Huang et al. . | |
| 5,632,371 | 5/1997 | Best et al. . | |
| 5,642,799 | * 7/1997 | Wassilow | 193/35 A |
| 5,685,416 | 11/1997 | Bonnet . | |
| 5,901,827 | * 5/1999 | Belz et al. | 193/355 |
| 5,906,267 | 5/1999 | Heit et al. . | |

\* cited by examiner

SPIRAL CONVEYOR APPARATUS WITH AUTOMATIC FLOW CONTROL

This application is a continuation of application Ser. No. 09/274,314, filed Mar. 23, 1999, which is a continuation application of application Ser. No. 08/914,424, filed Aug. 19, 1997, now U.S. Pat. No. 5,901,827.

BACKGROUND AND SUMMARY

The invention is directed to roller conveyor systems using gravity to move articles from an upper level to a lower level. More particularly, the present invention relates to a gravity powered spiral conveyor including means for assisting and controlling the movement of articles through the conveyor.

A conveyor in accordance of the invention provides an apparatus for automatically transporting articles from one level to a lower level or for accumulating articles in the conveyor based on article movement conditions. The conveyor of the invention can be used as part of a larger conveyor system and is readily adaptable for providing a range of height changes and direction changes. While the invention is preferably directed to a spiral conveyor, the inventive principles may be applied to other conveyor configurations, as will be appreciated by those skilled in the art, and the invention is not necessarily limited to the embodiments described below.

A conveyor in accordance with the invention includes a frame preferably defining a spiral conveying path from an upper level to a lower level. A conveying surface is provided by a plurality of freely rotatable rollers or skate wheels. A plurality of controllable, reversible powered rollers are individually disposed in the frame at predetermined intervals along the conveying path. Sensing means is mounted in the frame to detect the presence of conveyed articles adjacent each of the powered rollers. The powered rollers are controllable for assisting the gravity transport of the articles or for reversed rotation for accumulating articles in the conveyor when the downstream portion of the conveyor is full. Accumulate mode prevents articles from overloading the lower end of the conveyor when transport from the conveyor is blocked by holding the articles in the conveyor. This facilitates resumption of transport when the blocked condition is resolved.

According to the invention, a spiral conveyor includes a plurality of curved segments fastened to form a spiral path, each having a predetermined cant. The curvature and the cant of the segments can be selected so that the spiral executes a desired number of turns for a selected height change.

In accordance with a preferred embodiment of the invention, each of the segments is shaped to define a 90° arc which simplifies manufacturing and assembly. The 90° segment arcs provide a convenient size for the transport and accumulate modes of operation. In addition, 90° arcs allow the entry segment and exit segment to be oriented at a convenient parallel or perpendicular direction to accommodate the directions of the feed and takeaway conveyors.

According to another aspect of the invention, a powered roller is included in each of the segments to control the movement of a conveyed article through the segment. The powered rollers are controllable to rotate alternatively in a forward direction to assist the transport of articles down the conveyor or a reverse direction to accumulate articles in the conveyor.

According to yet another aspect of the invention, sensing means is included to sense the presence of an article in each of the segments. A signal from the sensing means is used to control the powered rollers. Preferably, the sensing means comprises a plurality of sensors mounted in the conveyor with one sensor in each segment. The sensing means can be any suitable device, for example, a photocell or a mechanical switch.

A control means receives the signals from the sensing means and uses the signal to determine whether to activate the powered rollers for transport mode or accumulate mode depending on a comparison of the presence of articles in adjacent segments, that is, whether a downstream segment is clear to receive an article from the segment immediately upstream.

The control means operates in transport mode to activate a roller to rotate in a forward direction in a segment when the sensing means senses the presence of the article in the segment and senses that the downstream adjacent segment is clear.

In transport mode, the rollers rotate at a set speed in a direction for forward movement of the articles. Thus, articles of light weight that may have difficulty overcoming inertial or frictional forces on the conveyor are accelerated, and heavier articles that may move too fast for the takeaway conveyor to handle smoothly are slowed down by friction produced in moving across the powered roller.

The control means operates in an accumulate mode upon sensing that an article has remained in a segment for a predetermined length of time. When accumulate mode is activated, the control means activates the rollers in that segment to rotate in reverse to hold the article in the segment, and as an article is sensed in the immediately upstream segment, that roller is rotated in reverse. The control means continues to activate the segments in reverse sequence as long as a downstream blockage exists. When the downstream segment clears, the control means reverts to transport mode and activates the segments to resume moving articles forward in the same order in which they were set in accumulate mode.

DESCRIPTION OF THE DRAWINGS

The invention will be better understood through the following detailed description in conjunction with the appended drawings, in which.

DETAILED DESCRIPTION

Figure 1:
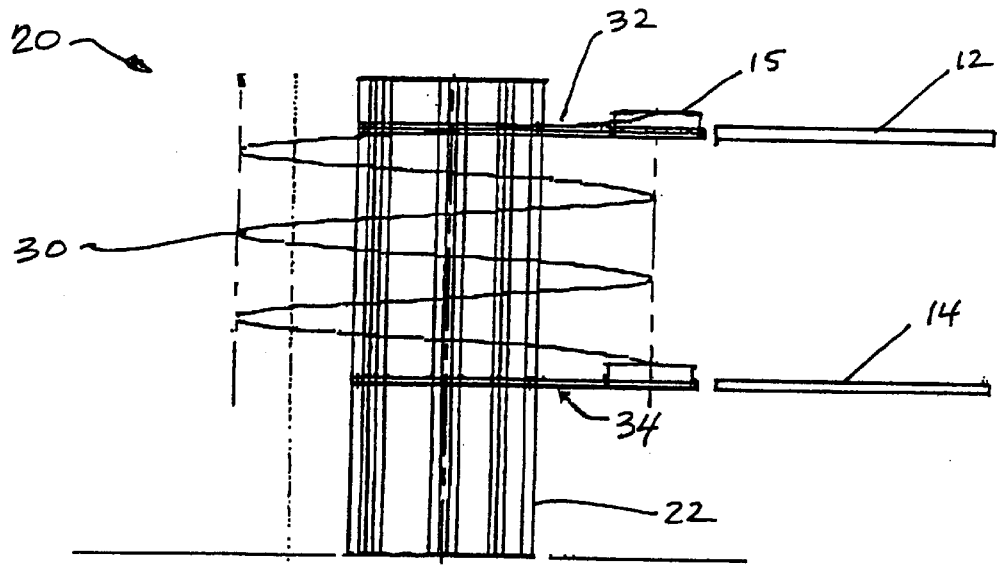
FIG. 1 is a schematic representation of a front view of a spiral conveyor in accordance with the invention.

A conveyor system according to the invention is shown schematically in FIG. 1. The conveyor system 20 comprises a base 22 and a conveyor frame 30 supported on the base. The conveyor frame 30 is formed as a spiral descending from an upper entry level 32 to a lower exit level 34. The conveyor frame 30 includes roller devices providing a conveying surface to allow an article 15 entering the conveyor frame 30 to travel by force of gravity from the entry level 32 to the exit level 34. The spiral conveyor system 20 can be connected to a larger conveyor system having a feed conveyor 12 to deliver articles to the spiral conveyor 20 and a takeaway conveyor 14 to transport articles from the spiral conveyor to a downstream conveyor.

Figure 2:
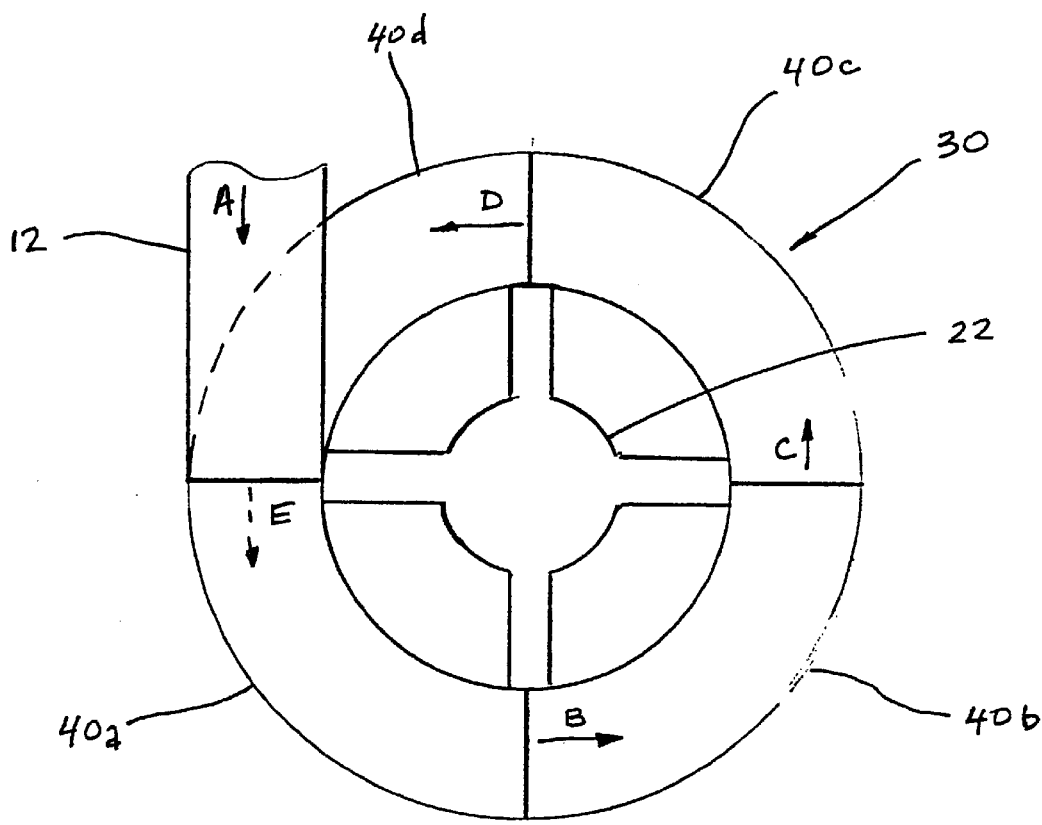
FIG. 2 is a top view of the spiral conveyor of FIG. 1.

As seen in FIG. 2, the conveyor 30 according to the invention is assembled from a plurality of curved segments 40a, 40b, 40c, and so on, mounted together on the base 22 to form the spiral conveyor frame 30. According to a preferred embodiment, the segments are shaped to have a uniform, predetermined downward cant, which allows the segments to be conveniently joined to form a spiral spanning a desired height. In addition, the arcs preferably are formed as 90° arcs.

The cant can be selected so that the spiral provides a desired number of full or part turns for a given height change. The 90° turn of the segments permits the entry and exit levels to be mutually oriented at any parallel or perpendicular direction. For example, if a feed conveyor 12 having a direction A, as indicated by the arrow in FIG. 2, is connected to segment 40a, a takeaway conveyor can be connected, after an appropriate number of intervening segments for a desired height change, at a desired exit direction parallel C or E, or perpendicular B or D, to the feed conveyor 12 direction.

Conveyor segment arcs of 90° are convenient for manufacture and assembly, however, the segments 40 may be formed as other than 90° arcs, as is convenient for the particular installation, and the invention is not limited to the embodiment described.

Figure 3:
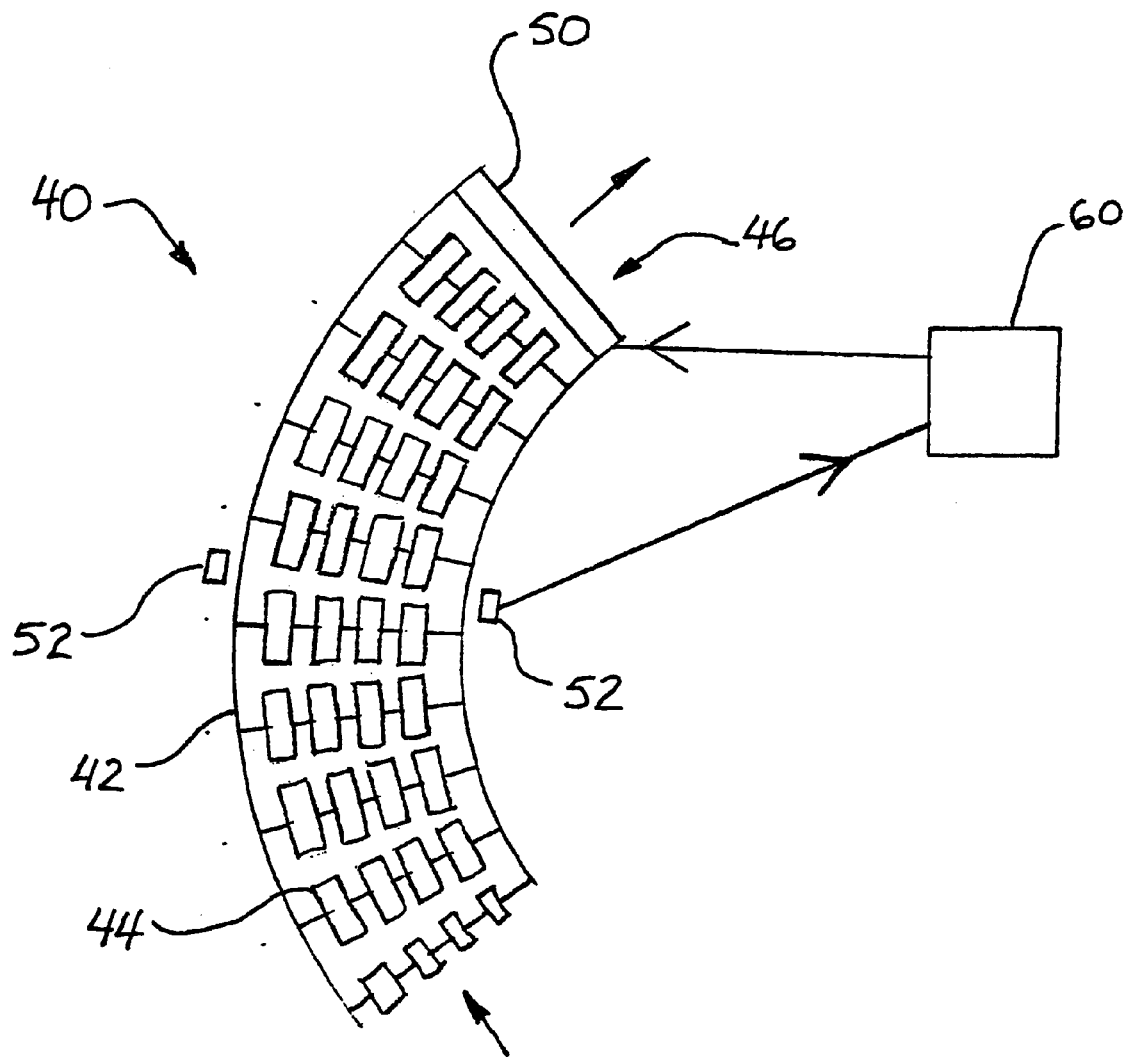
FIG. 3 is a view of a conveyor segment in accordance with the invention

FIG. 3 illustrates in a highly simplified form a conveyor segment 40 in accordance with the invention. The arrows indicate the direction of travel for articles on the segment 40. The segment 40 includes a chassis 42 supporting a plurality of roller devices 44. The roller devices 44 can be skate wheels, as illustrated, or can be roller balls, cylindrical rollers, or other suitable devices.

Each segment 40 also includes a powered roller 50. The powered roller 50 can be rotated alternatively in a direction to correspond with a forward travel direction of the segment, or in a reverse direction to resist forward movement. Powered, reversible rollers suitable for the apparatus according to the invention are available from several roller manufacturers, for example, the Interroll Model 8.220P44D15 is one such suitable roller. The powered rollers 50 are provided with an outer coating of PVC to provide a suitable friction surface. The rollers 50 rotate at a set speed and will add thrust to speed up slower moving, light weight articles and will drag on faster moving, heavier articles to slow them, and will thus help make the flow of articles more uniform.

The powered roller 50 may be located at any convenient place on the segment. For reasons of manufacturing convenience, the roller 50 is preferably mounted at the exit end 46 of the segment. However, the roller can be positioned anywhere in the segment.

Each segment also includes a sensor 52 mounted on the chassis 42 upstream of the powered roller 50. The sensor 52 detects the presence of a conveyed article in the segment before it reaches the roller 50 and sends a signal to a controller 60, described below, for activating the roller. The sensor 52 is located a sufficient distance from the powered roller 52 to allow the controller 60 to receive a signal from the sensor and to activate the roller to be rotating as the article reaches the roller. Preferably, the sensor 52 is positioned at about the midpoint of travel of the segment. Alternatively, the sensor could be placed at any location upstream of the powered roller, and the controller 60 could be programmed to take into account the distance, if necessary.

According to a preferred embodiment of the invention, the sensor 52 is a photoelectric device having a light source and a photocell, as illustrated. Other sensing devices may be used, for example, a mechanical switch having a leaf interposed in the conveying path.

The controller 60 is a programmable microprocessor that is connected to receive signals from each of the sensors 152 and, using that information, to control the powered rollers 50 for either a transport mode or an accumulate mode.

According to a programmed operational method in accordance with the invention, the controller 60 receives a signal from a sensor N indicating that an article is present in segment N, where "N" indicates any segment in the spiral conveyor. The controller 60 then checks the condition of sensor N+1 in segment N+1 immediately downstream of segment N (for the exit segment, the term "N+1" indicates a takeaway conveyor connected at the exit segment). If sensor N+1 is clear, the controller 60 activates roller N to rotate in a forward direction, which corresponds to transport mode. If sensor N+1 indicates an article present, the controller checks for how long the sensor N+1 has indicated the presence of the article. If the duration of the "article present" signal from sensor N+1 is more than a predetermined time, the controller activates roller N to rotate in reverse to prevent the article in segment N from traveling to segment N+1. Subsequently, when the sensor N+1 indicates the segment is clear, the controller activates the roller N to rotate in the forward transport direction and transport mode resumes.

When operating in transport mode, the controller coordinates the rotation of the rollers to facilitate the movement of articles through the conveyor. As an article enters the spiral conveyor and is sensed by the first sensor in the first segment, the controller determines whether the next downstream segment is clear. If so, the controller then starts the first roller in forward, transport rotation. After the articles passes the first roller, the first sensor senses that the article has passed, and the controller turns the first roller off and starts the second roller in the second segment. As the article passes the second roller and second sensor, the controller turns off the second roller and activates the third roller in the third segment. This operation continues until the article passes the bottom segment. The system works continuously and will operate simultaneously for articles as they enter and travel through the various segments.

Accumulate mode will usually be initiated by a blocked condition at the exit conveyor segment 34. The controller will first activate the exit conveyor roller to rotate for accumulating articles, and will activate segments sequentially, up to the entry conveyor if necessary. By way of example, the exit conveyor can become blocked because of a condition at the takeaway conveyor 14 causing a backlog of articles. The controller will activate the exit roller to rotate in reverse to accumulate articles if the sensor at the exit conveyor senses the presence of an article for predetermined time duration. The time duration is sufficiently long to determine that an article has actually stopped at the sensor (and is not merely slow moving), and a duration in the range of about 2 to 5 seconds has been found to be suitable. The time duration can be adjusted for the size and normal transport speed of the articles in the conveyor.

Depending on the size of the articles, the exit segment (and of course, each of the other segments) can accumulate at least one, and usually several articles. The accumulation of articles in the exit segment will eventually cause an article to stall in the preceding segment, thus blocking the preceding sensor. A signal from this preceding sensor to the controller indicating the presence of an article for more than the predetermined time will cause the controller to activate reverse rotation of the associated roller, and accumulation will occur in this segment. The change to accumulation mode continues upward through the conveyor as each segment senses the presence without movement of the articles.

When the controller receives a signal that the takeaway conveyor is clear, the roller in the exit conveyor is changed to rotate for transport, and the previously accumulated articles are transported to the takeaway conveyor. The sensor in the exit conveyor will then indicate that the exit conveyor is clear, and the controller will then change the next upstream roller to rotate in transport mode, thus releasing articles from that segment, and so on up to the entry segment.

The controller can be programmed to determine whether the clear signal from a sensor has a predetermined duration, for example 2 seconds, to avoid changing to transport mode for simple shifts or slippage of the articles in the exit conveyor.

It will be understood that Applicants' invention is not limited to the particular embodiments that have been described and illustrated. This application contemplates any and all modifications that fall within the spirit and scope of Applicants' invention as defined by the following claims.

What is claimed is:

1. A method for operating a gravity conveyor having powered rollers mounted at intervals to define a plurality of zones to assist and control transport of the articles, comprising the steps of:

repeatedly monitoring each zone for the presence of an article in the zone;

activating a powered roller in a zone for transport rotation when an article is sensed in the zone and a next zone immediately downstream is sensed as clear for transport; and controlling a powered roller in a zone for accumulate mode when an article is sensed in the zone and a next zone immediately downstream is sensed as blocked.

2. The method as claimed in claim 1, wherein a zone is sensed as blocked if an article is sensed in the zone for at least a predetermined time duration.

3. The method as claimed in claim 1, wherein a zone is sensed as clear for transport if no article is sensed in the zone for more than a predetermined time duration.

4. The method as claimed in claim 1, further comprising the steps of sensing an article in an exit zone for at least a predetermined time duration and controlling an exit zone powered roller in an accumulate mode.

5. The method as claimed in claim 4, further comprising the steps of sensing that a takeaway conveyor is clear for transport and changing the exit zone roller from accumulate mode to transport rotation.

* * * * *